(12) United States Patent
Kim et al.

(10) Patent No.: US 10,075,273 B2
(45) Date of Patent: *Sep. 11, 2018

(54) METHOD AND SYSTEM HAVING REFERENCE SIGNAL DESIGN FOR NEW CARRIER TYPES

(71) Applicant: BlackBerry Limited, Waterloo (CA)

(72) Inventors: Joon Beom Kim, Carrollton, TX (US); Yi Song, Plano, TX (US); Zhijun Cai, Ashburn, VA (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/185,847

(22) Filed: Jun. 17, 2016

(65) Prior Publication Data

US 2016/0301508 A1 Oct. 13, 2016

Related U.S. Application Data

(63) Continuation of application No. 13/569,985, filed on Aug. 8, 2012, now Pat. No. 9,402,256.

(51) Int. Cl.
| | |
|---|---|
| H04L 5/00 | (2006.01) |
| H04W 72/04 | (2009.01) |
| H04B 7/024 | (2017.01) |
| H04W 84/04 | (2009.01) |
| H04W 88/02 | (2009.01) |

(52) U.S. Cl.
CPC ........... H04L 5/0051 (2013.01); H04B 7/024 (2013.01); H04L 5/0023 (2013.01); H04L 5/0091 (2013.01); H04W 72/0453 (2013.01); H04W 84/045 (2013.01); H04W 88/02 (2013.01)

(58) Field of Classification Search
None
See application file for complete search history.

(56) References Cited

U.S. PATENT DOCUMENTS

| | | | |
|---|---|---|---|
| 8,184,573 B2 | 5/2012 | Higuchi et al. | |
| 8,254,329 B2 | 8/2012 | Ko et al. | |
| 8,693,429 B2 | 4/2014 | Montojo et al. | |
| 8,798,178 B2 | 8/2014 | You et al. | |

(Continued)

FOREIGN PATENT DOCUMENTS

WO 2011017467 10/2011

OTHER PUBLICATIONS

United States Patent and Trademark Office, Office action issued in U.S. Appl. No. 13/569,974, dated Sep. 10, 2014, 24 pages.

(Continued)

*Primary Examiner* — Jamal Javaid
*Assistant Examiner* — Rose Clark
(74) *Attorney, Agent, or Firm* — Fish & Richardson P.C.

(57) ABSTRACT

A method and network element for providing reference signals to a user equipment, the method determining a reference signal pattern at the network element; and sending the reference signals to the user equipment using a reference signal mapping based on the reference signal pattern. Further a method and user equipment for receiving reference signals from a network element, the method determining a reference signal mapping at the user equipment; and detecting the reference signals at the user equipment using the reference signal mapping.

24 Claims, 16 Drawing Sheets

(56) References Cited

U.S. PATENT DOCUMENTS

| | | | |
|---|---|---|---|
| 2007/0258352 A1 | 11/2007 | Wang et al. | |
| 2010/0014481 A1* | 1/2010 | Ko | H04L 5/0007 370/330 |
| 2010/0124291 A1 | 5/2010 | Muharemovic et al. | |
| 2010/0246527 A1 | 9/2010 | Montojo et al. | |
| 2010/0266060 A1 | 10/2010 | Kimura et al. | |
| 2010/0322179 A1 | 12/2010 | Yu et al. | |
| 2011/0085610 A1 | 4/2011 | Zhuang et al. | |
| 2011/0134879 A1 | 6/2011 | Ogawa et al. | |
| 2011/0199986 A1 | 8/2011 | Fong et al. | |
| 2011/0244850 A1 | 10/2011 | Lindoff et al. | |
| 2011/0244877 A1 | 10/2011 | Farajidana et al. | |
| 2011/0252139 A1 | 10/2011 | Bhattad et al. | |
| 2012/0009959 A1 | 1/2012 | Yamada et al. | |
| 2012/0021753 A1 | 1/2012 | Damnjanovic et al. | |
| 2012/0033643 A1 | 2/2012 | Noh et al. | |
| 2012/0046030 A1 | 2/2012 | Siomina et al. | |
| 2012/0051209 A1 | 3/2012 | Sun et al. | |
| 2012/0076213 A1 | 3/2012 | Zhang et al. | |
| 2012/0113816 A1* | 5/2012 | Bhattad | H04L 5/0032 370/246 |
| 2012/0120903 A1 | 5/2012 | Kim et al. | |
| 2012/0134273 A1 | 5/2012 | Bhattad et al. | |
| 2012/0176939 A1 | 7/2012 | Qu et al. | |
| 2012/0224555 A1 | 9/2012 | Lee et al. | |
| 2012/0282935 A1 | 11/2012 | Koivisto et al. | |
| 2013/0039203 A1 | 2/2013 | Fong et al. | |
| 2013/0094384 A1 | 4/2013 | Park et al. | |
| 2013/0107840 A1 | 5/2013 | Ro et al. | |
| 2013/0114535 A1 | 5/2013 | Ng et al. | |
| 2013/0114564 A1 | 5/2013 | Ogawa et al. | |
| 2013/0242771 A1 | 9/2013 | Ohta et al. | |
| 2013/0244678 A1 | 9/2013 | Damnjanovic et al. | |
| 2013/0250875 A1 | 9/2013 | Chen et al. | |
| 2013/0279362 A1 | 10/2013 | Park et al. | |
| 2013/0301434 A1 | 11/2013 | Krishnamurthy et al. | |
| 2013/0301451 A1 | 11/2013 | Siomina et al. | |
| 2013/0301531 A1 | 11/2013 | Tao | |
| 2013/0301566 A1 | 11/2013 | Wei et al. | |
| 2013/0303171 A1 | 11/2013 | Jang et al. | |
| 2013/0303217 A1 | 11/2013 | Tao | |
| 2013/0315197 A1 | 11/2013 | Park et al. | |
| 2013/0337822 A1 | 12/2013 | Rubin et al. | |
| 2013/0344869 A1 | 12/2013 | Yamada | |
| 2014/0044104 A1 | 2/2014 | Kim et al. | |
| 2014/0056265 A1 | 2/2014 | Koivisto et al. | |
| 2014/0086085 A1 | 3/2014 | Zheng et al. | |
| 2014/0219152 A1 | 8/2014 | Anto et al. | |
| 2014/0286219 A1 | 9/2014 | Siomina et al. | |

OTHER PUBLICATIONS

United States Patent and Trademark Office, Office action issued in U.S. Appl. No. 13/569,974, dated Feb. 12, 2014, 120 pages.
United States Patent and Trademark Office, Office action issued in U.S. Appl. No. 13/569,974, dated May 13, 2014, 20 pages.
Wen et al., Adaptive Design Method for L TE-Advanced Reference Signals, 3 pages.
ETSI TS 36.211 version 9.1.0 Release 9, Apr. 2010, 87 pages.
United States Patent and Trademark Office, Office action issued in U.S. Appl. No. 13/569,974, dated Jun. 27, 2014, 4 pages.
International Searching Authority, "The International Search Report and the Written Opinion," issued in International Application No. PCT/US13/53946, dated Oct. 11, 2013, 12 pages.
R1-101712, 3GPP TSG-RAN WG1 Meeting #60bis, Beijing, China, Apr. 12-16, 2010, "3GPP TSG-RAN WG4 (Radio) Meeting #54, San Francisco, USA, Feb. 22-26, 2010, NTT DoCoMo, Title: Reply LS on additional carrier types for L TE-A", 2 pages.
RP-110451; 3GPP TSG RAN Meeting #51, Kansas City, USA, Mar. 15-18, 2011, "LTE Carrier Aggregation Enhancements", WID, (Core part), Nokia Corporation, Nokia Siemens Networks, 11 pages.
RP-110732; TSG RAN meeting #52, Bratislava, Slovakia, May 31-Jun. 3, 2011, "Update to LTE Carrier Aggregation Enhancements WID", (Core Part), Nokia Corporation, Nokia Siemens Networks, 11 pages.
3GPP TS36.211 v10.3.0 (Sep. 2011): 3rd Generation Partnership Project; Technical Specification Group Radio Access Network; Evolved Universal Terrestrial Radio Access (E-UTRA); Physical channels and modulation, (Release 10), 104 pages.
3GPP TS36.212 V10.3.0 (Sep. 2011): 3rd Generation Partnership Project Technical Specification Group Radio Access Network; Evolved Universal Terrestrial Radio Access (E-UTRA); Multiplexing and channel coding, (Release 10), 79 pages.
GPP TS36.213 V10.3.0 (Sep. 2011): 3rd Generation Partnership Project; Technical Specification Group Radio Access Network; Evolved Universal Terrestrial Radio Access (E-UTRA); Physical layer procedures, (Release 10), 122 pages.
3GPP TS36.331 V10.3.0 (Sep. 2011): 3rd Generation Partnership Project Technical Specification Group Radio Access Network; Evolved Universal Terrestrial Radio Access (E-UTRA); Radio Resource Control (RRC); Protocol specification (Release 10), 297 pages.
RP-110732; TSG RAN meeting #52, Bratislava, Slovakia, May 31-Jun. 3, 2011, "Update to LTE Carrier Aggregation Enhancements WID", (Performance Part), Nokia Corporation, Nokia Siemens Networks, 9 pages.
R1-121019, 3GPP TSG RAN WG1 Meeting #68bis, "Synchronization performance on additional carrier types", Ericsson and ST-Ericsson, Mar. 2012, Jeju, Korea, 10 pages.
R1-121491, 3GPP TSG RAN WG1 meeting #68bis, "Time and frequency synchronization performance evaluation", Huawei and HiSilicon, Mar. 2012, Jeju, Korea, 9 pages.
R1-121082, 3GPP TSG RAN WG1 Meeting #68bis, "Design of additional carrier types in Rel-11", CATI, Mar. 2012, Jeju, Korea, 4 pages.
RP-110451, 3GPP TSG RAN Meeting #51, Kansas City, USA, Mar. 15-18, 2011, "L TE Carrier Aggregation Enhancements" (Feature Part), WID, Nokia Corporation, Nokia Siemens Networks, 8 pages.
RP-110451; 3GPP TSG RAN Meeting #51, Kansas City, USA, Mar. 15-18, 2011, "L TE Carrier Aggregation Enhancements" (Performance Part), WID, Nokia Corporation, Nokia Siemens Networks, 9 pages.
RP-110732; TSG RAN meeting #52, Bratislava, Slovakia, May 31-Jun. 3, 2011, "Update to LTE Carrier Aggregation Enhancements WID", (Feature Part), Nokia Corporation, Nokia Siemens Networks, 7 pages.
Office Action issued in GB Application No. GB1500482.3 dated Oct. 24, 2017; 5 pages.
Office Action issued in GB Application No. GB1500480.7 dated Oct. 24, 2017; 6 pages.
Office Action issued in GB Application No. GB1500482.3 dated Feb. 28, 2018; 2 pages.
Office Action issued in GB Application No. GB1500480.7 dated Feb. 28, 2018; 3 pages.

* cited by examiner

METHOD AND SYSTEM HAVING REFERENCE SIGNAL DESIGN FOR NEW CARRIER TYPES

This patent claims the benefit of U.S. Non-Provisional application Ser. No. 13/569,985, filed Aug. 8, 2012, the entire contents of which is hereby expressly incorporated by reference herein in its entirety.

FIELD OF THE DISCLOSURE

Reference signals between the network element and a mobile device and in particular relates to orthogonal frequency division multiplexing (OFDM) reference signals.

BACKGROUND

The 3$^{rd}$ Generation Partnership Project (3GPP) Long Term Evolution (LTE) Standards are being enhanced to achieve better system performances by utilizing currently available frequency spectrums in a more efficient manner. The evolution of the LTE is referred to as Long Term Evolution-Advanced (LTE-Advanced). In LTE Advanced, the peak target data rates are 1 Gbps and 500 Mbps for downlink and uplink respectively.

In order to achieve the target data rates, one approach is to use carrier aggregation (CA) techniques to utilize bandwidth aggregation of a variety of different arrangements of component carriers (CCs) including the same or different bandwidths, adjacent or non-adjacent CCs in the same frequency band or different frequency band. In order to achieve carrier aggregation enhancements in LTE-Advanced, the 3GPP radio access network (RAN) utilize a new carrier type (NCT) scenario for either stand alone or non-stand-alone carrier type. To deal with this new carrier type, one consideration is the reference signal.

BRIEF DESCRIPTION OF THE DRAWINGS

The present disclosure will be better understood with reference to the drawings, in which.

DETAILED DESCRIPTION OF THE DRAWINGS

Figure 1A:
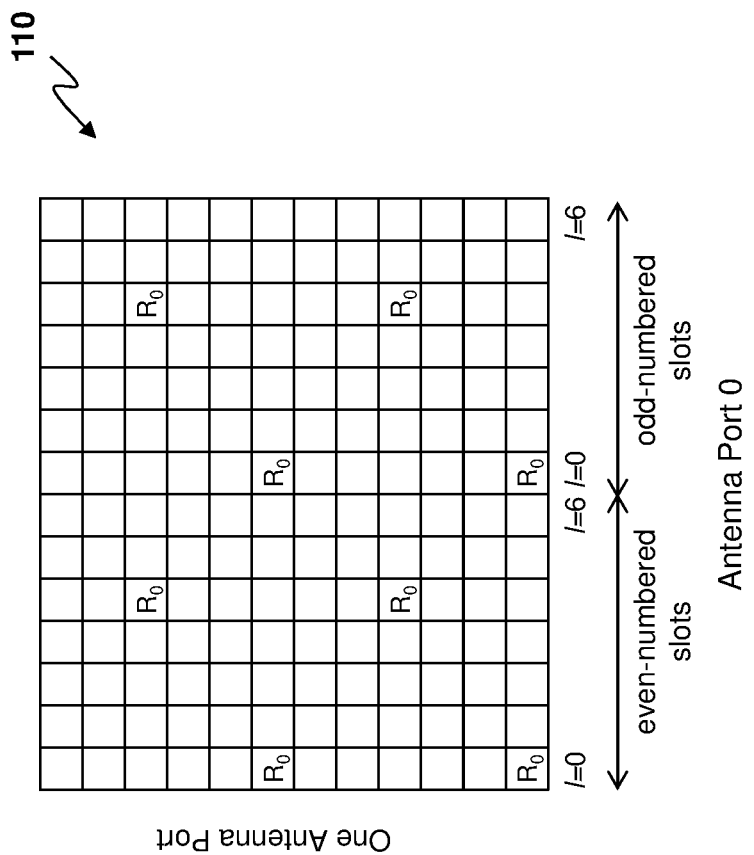
FIG. 1A is a block diagram showing a one antenna port case for a mapping of downlink reference signals utilizing a normal cyclic prefix.

The present disclosure provides a method for providing reference signals to a user equipment from a network element, the method comprising: determining a reference signal pattern at the network element; and sending the reference signals to the user equipment using a reference signal mapping based on the reference signal pattern.

The present disclosure further provides a network element for providing reference signals to a user equipment, the network element comprising: a processor, wherein the processor is configured to: determine a reference signal pattern at the network element; and send the reference signals to the user equipment using a reference signal mapping based on the reference signal pattern.

The present disclosure further provides a method for receiving reference signals at a user equipment from a network element, the method comprising: determining a reference signal mapping at the user equipment; and detecting the reference signals at the user equipment using the reference signal mapping.

The present disclosure further provides a user equipment for receiving reference signals from a network element, the user equipment comprising: a processor, wherein the processor is configured to: determine a reference signal mapping at the user equipment; and detect the reference signals at the user equipment using the reference signal mapping.

While the present disclosure is described with regards to the 3GPP LTE-Advance New Carrier Type, the embodiments present herein could equally be applied to other network types and network elements, and the present disclosure is not limited to any particular network type or element.

As used herein, a network element could be any network side entity, including but not limited to an evolved Node B (eNB), access point, base station, relay, among others.

A user equipment, as used herein, could be any computing device communicating with a network element, and includes but is not limited to a mobile device, a tablet, a laptop, a data enabled cellular telephone or pager, a personal computer, among others.

Reference Signals

Downlink reference signals are a predefined signal which occupies specific resource elements (REs) in the downlink time-frequency lattice. Various types of downlink reference signals exist and are transmitted for different purposes. For example, in the 3GPP LTE Release 8, the common reference signals are designed for time and frequency tracking, channel estimation for channel state information (CSI) feedback and data demodulation, as well as radio resource management (RRM).

A UE, in an initial stage after a cell search is performed, still may need to keep track of time and frequency synchronization to the cell to compensate for the error from a local oscillator or Doppler effects based on common reference signals (CRSs).

In the 3GPP LTE Release 10 Standard, the CSI-RS is introduced to support up to eight transmit antennas and multi-cell cooperative transmission schemes, such as cooperative multipoint (CoMP) and heterogeneous networks (HetNet).

With any reference signals (RSs), in order to correctly estimate wireless channels, a reference signal spacing must satisfy the Nyquist sampling theorem in time and frequency domains. For the time domain, the reference signal spacing is related to the Doppler spread, which is given by equation 1 below.

$$P_t < \frac{1}{2f_{d,max}T_s} \quad (1)$$

In the above, $f_{d,max}$ and $T_s$ are the maximum Doppler frequency and an OFDM symbol duration including guard intervals, respectively. $P_t$ is the reference signal spacing on the time domain.

For frequency domain, the spacing is related to the delay spread given by equation 2 below.

$$P_f < \frac{N}{L} \quad (2)$$

In equation 2, N and L are the number of subcarriers and the maximum number of channel delay profiles in an OFDM symbol, respectively. $P_f$ is the reference signal spacing on the frequency domain.

As indicated above, various types of reference signals may exist. These include cell-specific reference signals, UE-specific reference signals and channel state information reference signals. Each is discussed below.

With regard to cell-specific reference signals, in the 3GPP LTE Release 8, 9, 10 and 11 standards, cell-specific reference signals are mainly used for channel quality estimation and channel estimation for demodulation of control channels and physical downlink shared channel (PDSCH) which does not use a UE-specific reference signal. Further, cell-specific reference signals (CRSs) as well as the primary synchronization signal/secondary synchronization signal (PSS/SSS) may be used for time and frequency synchronization while the UE is either in a connected mode or in an idle mode. Existing reference signal received power (RSRP)/reference signal received quality (RSRQ) measurements are performed over a measurement bandwidth, which is configurable.

Figure 1B:
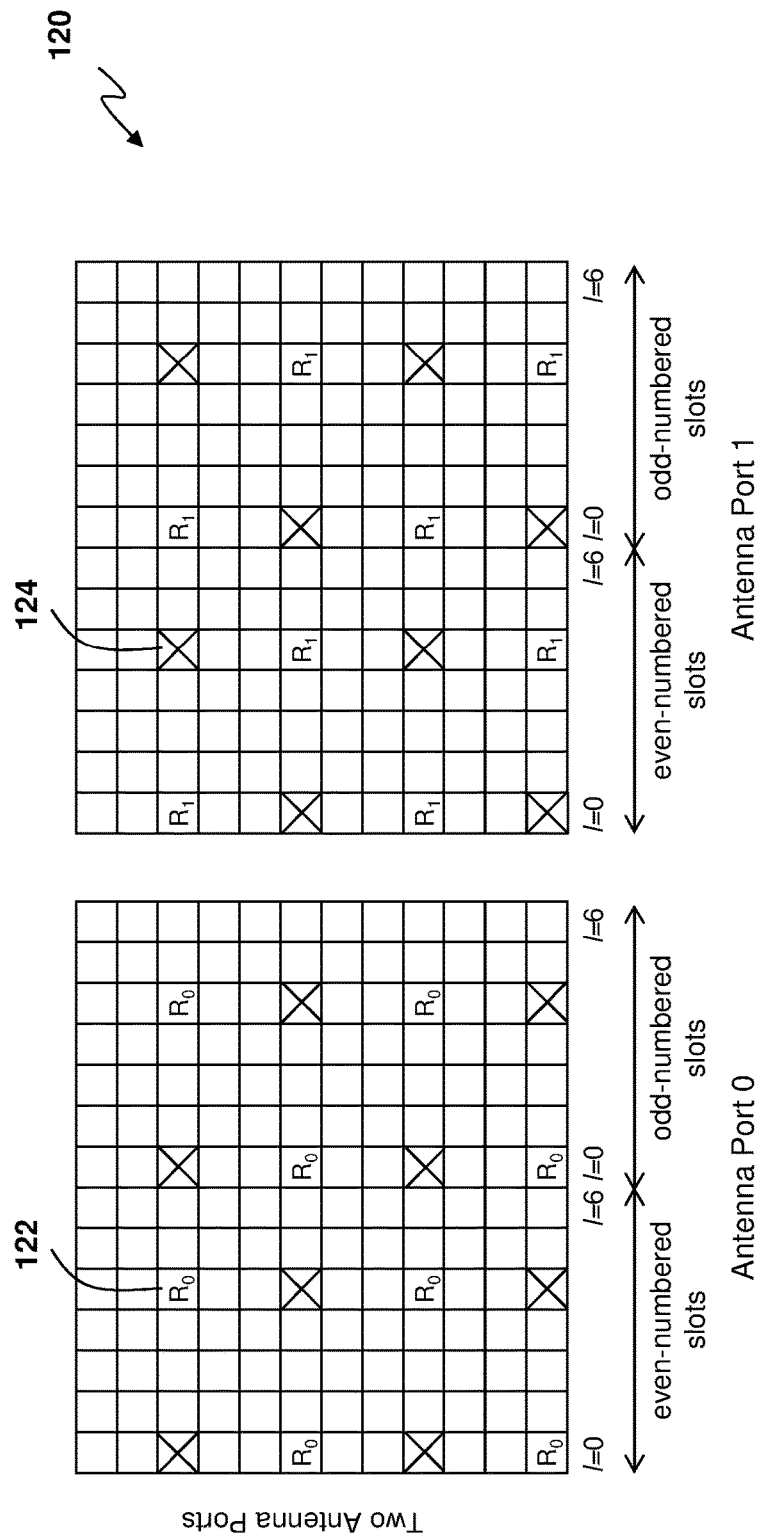
FIG. 1B is a block diagram showing a two antenna port case for a mapping of downlink reference signals utilizing a normal cyclic prefix.
Figure 1C:
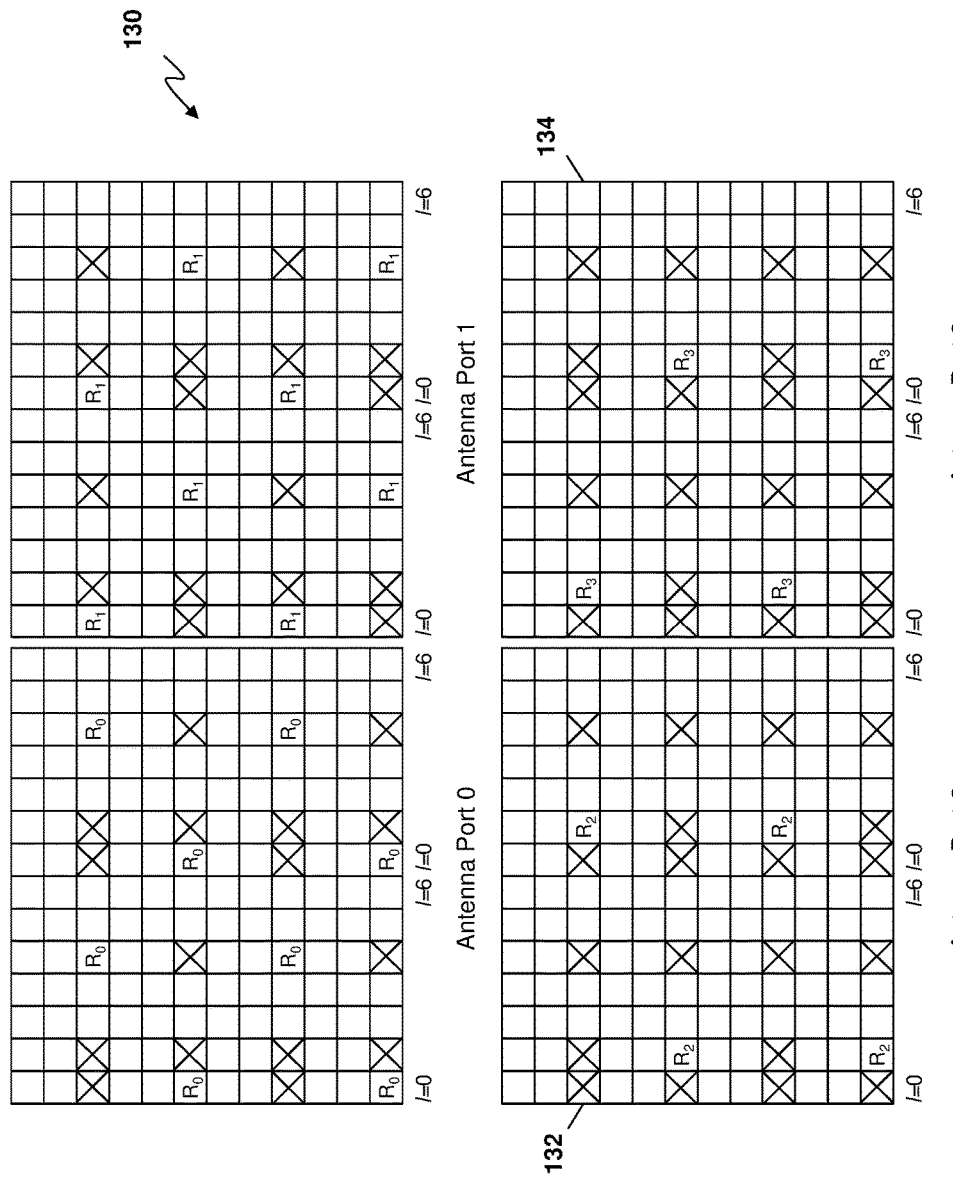
FIG. 1C is a block diagram showing a four antenna port case for a mapping of downlink reference signals utilizing a normal cyclic prefix.

Reference is now made to FIGS. 1A, 1B and 1C, which show a mapping of downlink reference signals utilizing a normal cyclic prefix.

As seen in FIG. 1A, a time-frequency lattice 110 shows a one antenna port case 110. In FIG. 1B, the time frequency lattices 120 show a two antenna port case and in FIG. 1C, the time frequency lattices 130 show a four antenna port case.

In each of the cases in FIGS. 1A-1C, a time-frequency lattice is provided in which reference signals are mapped to specific locations. As seen in FIG. 1B, with two antenna ports various reference signals 122 may be used for a particular antenna port. The same time and frequency slot in the other antenna port, shown by element 124 is not used for transmission on that antenna port.

Thus, as shown in FIG. 1C, antenna port numbers 0 to 3 may be used by an eNB to provide four separate channel estimates. For each antenna port, a difference RS mapping pattern has been designed to minimize the intra-cell or inter-cell interference between multiple transmit antenna ports.

For example on antenna port 2, designated by reference signal 132, and antenna port 3, designated by reference signal 134, only four reference signals are provided for these antenna ports, which is half of the number for the antenna ports 0 and 1. This is due to the fact that high speed user equipments (UEs) are unlikely to use all four antenna ports to achieve sufficient channel estimation accuracy.

Reference signal spacing in time and frequency can be determined by the maximum Doppler spread and the delay spread, respectively. For example, assume that the carrier frequency is 2 GHz and the speed of a mobile is 500 km/h, then the reference signal spacing on the time domain is $T_c \approx 1/(2f_{d,max}) \approx 0.5$ in order to satisfy the Nyquist sampling theorem in the time domain, as described in equation 1 above. Based on the above, two reference signals per slot are needed in the time domain.

In the frequency direction, one reference signal is inserted into every six subcarriers on an OFDM symbol. Since the reference signals are staggered, one reference signal per three subcarriers within each reference block are provided. The reference signal spacing depends on the coherent bandwidth, which is related to channel delay spread. In particular, in LTE the channel delay spread is based on the 90% and 50% of the coherent bandwidth. Hence, if the root mean squared (rms) channel delay spread is $\sigma_\tau$ then 90% and 50% of coherent bandwidth is $B_{c,90\%}=1/(50\sigma_\tau)=20$ kHz and $B_{c,50\%}=1/(5\sigma_\tau)=200$ kHz respectively, where the maximum channel delay spread is 991 ns. Thus, the spacing between two reference signals in frequency direction is 45 kHz.

With regard to UE-specific reference signals, in the 3GPP Release 8, UE-specific reference signals may be transmitted in addition to cell-specific reference signals. The UE-specific reference signals, in general, are used to enable beamforming of the data transmissions to specific UEs.

Thus, UE-specific RSs are transmitted in the assigned radio resource blocks (RBs) for UEs on PDSCH transmission. Using the transmitted UE-specific RSs, a UE estimates channels and demodulates the data in the corresponding RBs. Since the same precoding is applied to the PDSCH data symbols before transmission, the signalling is not required to inform a UE of the precoding method and precoding parameters.

The pattern of the UE-specific RSs is chosen so that they do not collide with the cell-specific RSs. Further, the density of the UE-specific RS is half that of the cell-specific RSs to minimize overhead.

In LTE Release 9, UE-specific RSs are defined to also support dual-layer transmission. The dual-layer can be assigned to either one or two UEs depending on the transmission mode, which is related to single-user multiple-input multiple-output (SU-MIMO) or multi-user multiple-input multiple-output (MU-MIMO). While two spatial layers may be transmitted if one UE is assigned, a single layer from each of two UEs can be assigned if two UEs are selected.

A UE-specific RS can provide the scalability for LTE-Advanced to choose a design for new RSs. This may be used to achieve efficient inter-cell coordination by choosing a different pattern of cell-specific RSs. Further, since UE-specific RSs in the assigned RBs are for the channel estimation in the time-frequency lattice, the eigen-structure of the time and frequency channel covariance matrix can give insights into the optimal pattern of resource elements (REs) for RSs.

In one embodiment, length-2 orthogonal Walsh codes may be adopted to support two layers of the UE-specific RSs. Compared to frequency multiplexing, the code multiplexing scheme may improve the accuracy of interference estimations under slow wireless channel environments since the same set of RSs may be used regardless of the number of transmitted layers.

Figure 2A:
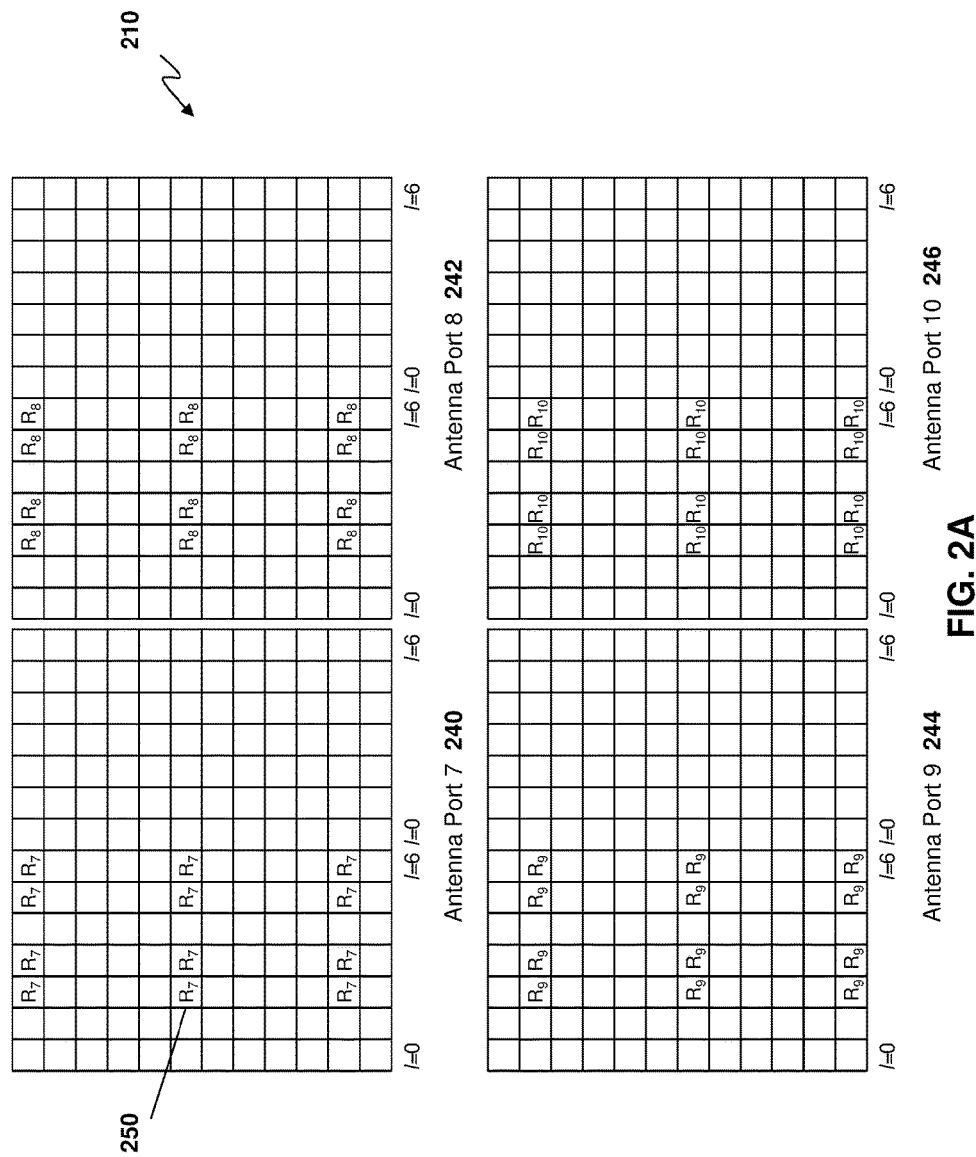
FIG. 2A is a block diagram showing time-frequency lattices for special subframes for configuration 1, 2, 6 or 7.
Figure 2B:
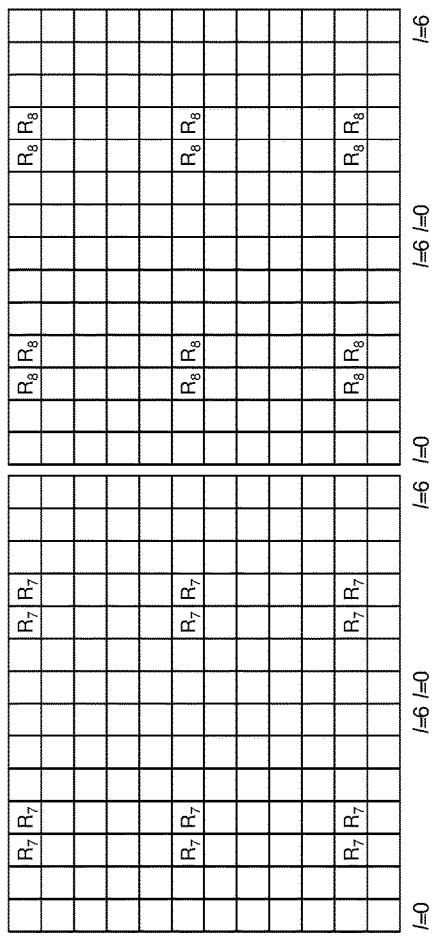
FIG. 2B is a block diagram showing time-frequency lattices for special subframes for configuration 3, 4, or 8.
Figure 2B:
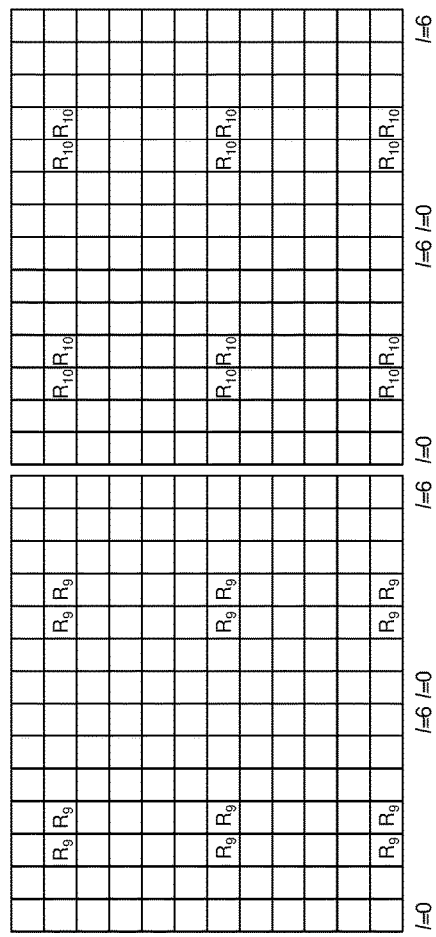
Figure 2C:
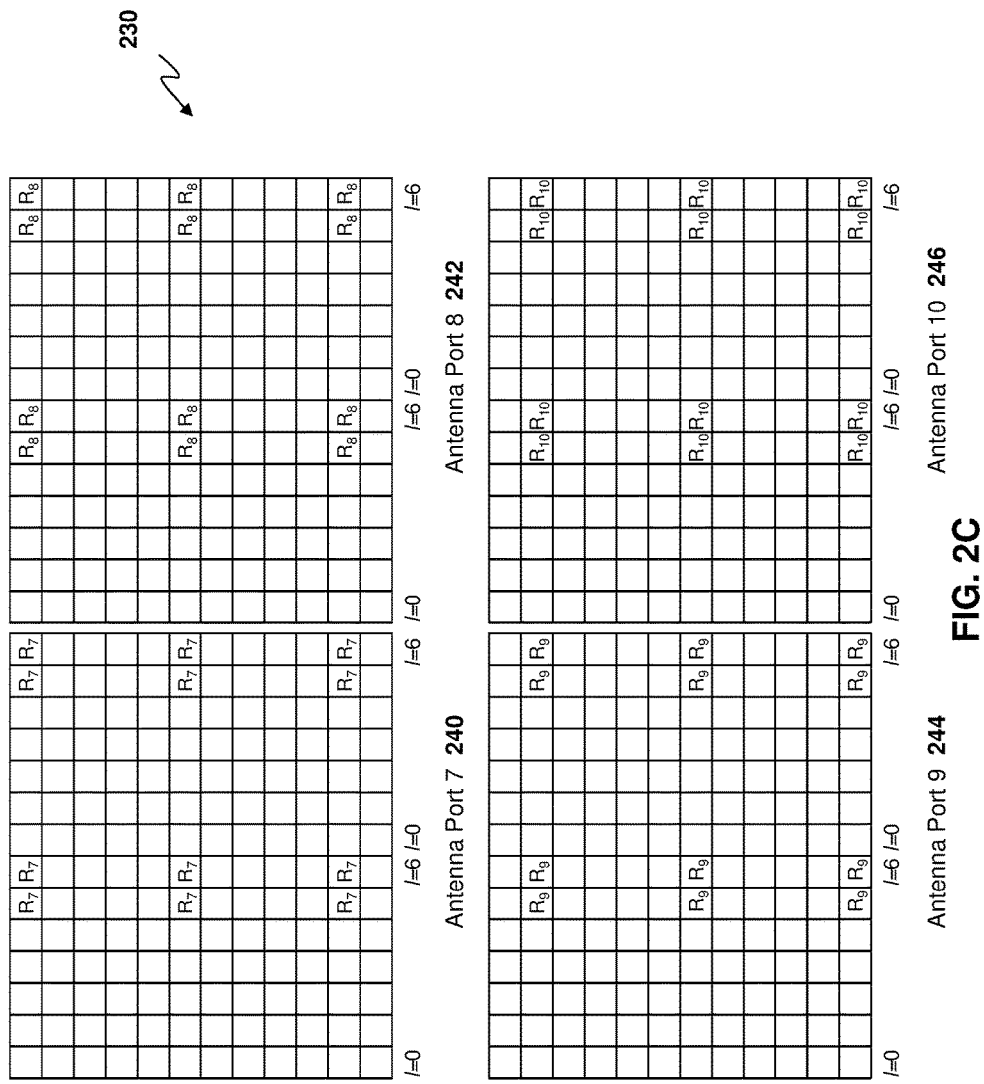
FIG. 2C is a block diagram showing time-frequency lattices for all other subframes than those of FIGS. 2A and 2B.

Reference is now made to FIGS. 2A, 2B and 2C, which shows the mapping of UE-specific reference signals on antenna ports 7, 8, 9 and 10.

FIG. 2A provides time-frequency lattices 210 for the special subframes for configurations 1, 2, 6 or 7. FIG. 2B provides time-frequency lattices 220 for a special subframe for configurations 3, 4, or 8. FIG. 2C provides time-frequency lattices 230 for all other downlink subframes.

For each case, each of the four antenna ports 240, 242, 244 and 246 can include reference signals 250. In the embodiments of FIGS. 2A, 2B and 2C, each shows the reference signals in different configurations between the cases. Further, in all of FIGS. 2A, 2B and 2C, on antenna port 7, and on antenna port 8 the reference signals are provided in the same location on the lattice, whereas in antenna port 9 and antenna port 10 the reference signals are provided in a different location from the first two antenna ports but on the same location with respect to each other.

In LTE Release 10, downlink SU-MIMO transmission is extended to support up to eight spatial layers by exploiting MU-MIMO transmission schemes. In order to achieve this, the precoded UE-specific RS is further used for the corresponding PDSCH data demodulation. Since the same precoding is applied to the UE-specific RS for each layer as the data symbols, explicit control signalling for precoding information regarding the precoding methods and the precoding parameters is not required to be sent to the assigned UE. The UE-specific RSs are designed to avoid overlapping with the cell-specific RSs and control channels to ensure backward compatibility and to avoid inter-layer RS interference by using orthogonal multiplexing.

In Release 10, the UE-specific RS pattern up to 2 layers are identical to that of the Release 9. The pattern for up to 4 layers is obtained by extending the rank-2 UE-specific RS pattern in a code division multiplexing (CDM)/frequency division multiplexing (FDM) manner. In other words, the four layers can be divided into two groups of two layers, and then each group is precoded with length-2 Walsh-Hadamard Orthogonal Cover Codes (OCC) in the LTE Release 9. Further, the UE-specific RSs in different groups are frequency multiplexed on adjacent subcarriers. For eight layer transmission, the UE-specific RS structure is further extended by using a hybrid CDM/FDM methods with two CDM groups that are precoded by a length-4 Walsh-Hadamard OCC.

In a further embodiment, the reference signal may be a channel state information reference signal (CSI-RS) The cell-specific reference signal is designated for up to four transmit antennas in Release 8 LTE. However, in Release 11, since up to eight transmit antennas are supported, new reference signals that are called CSI-RSs are provided to enable a UE to estimate and feedback the CSI corresponding to up to 8 transmit antenna parts over a whole bandwidth in an eNB.

Figure 3:
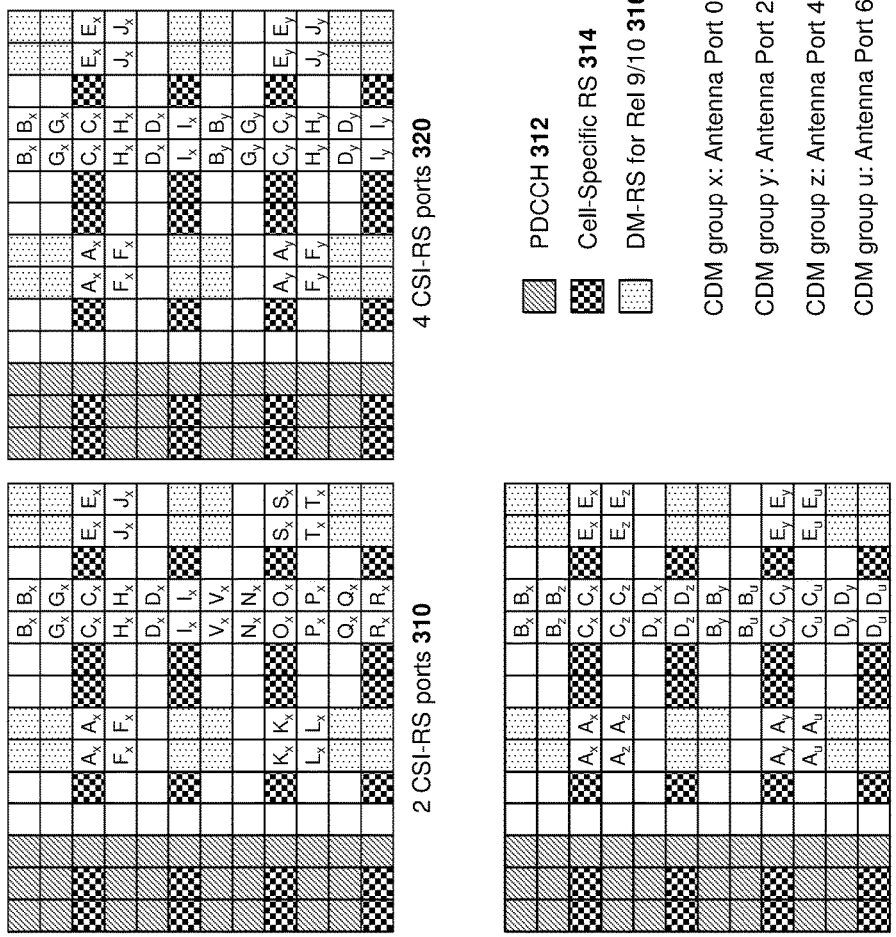
FIG. 3 is block diagram showing time-frequency lattices for channel state information reference signals for 2, 4 and 8 port scenarios.

The CSI-RS transmission is supported in Release 10 LTE for 1, 2, 4 and 8 transmit antenna ports as shown with regard to FIG. 3.

Referring to FIG. 3, a first lattice 310 is used for 2 CSI-RS ports and includes lattice locations for the PDCCH, designated by reference numeral 312, lattice locations for cell specific reference signals, designated by reference numeral 314 and lattice locations for Demodulation-RS (DM-RS), designated by reference numeral 316.

Further CSI having RS patterns are provided. FIG. 3, the term "Ax" designates the cell index "A" and the antenna port "x". The code division multiplex (CDM) group x is used for antenna ports 0 and 1, the CDM group y is used for antenna ports 2 and 3, the CDM group z is used for antenna ports 4 and 5 and the CDM group u is used for antenna ports 6 and 7. Thus, in the two antenna port embodiment 310, only group x is used. Further, in embodiment 320 having four antenna ports, both group x and group y are used and for embodiment 330 having eight antenna ports, groups x, y, z and u are all used.

CSI-RS is also designed to enable an UE to estimate the CSI for multiple cells rather than a single serving cell. To design the CSI-RS, the following design criteria may be utilized:

a. Uniform spacing in the frequency domain
b. In the time domain, a minimum number of subframes containing CSI-RS are used to allow minimal wake-up duty cycle when UE is in discontinuous reception (DRX) mode
c. One RE per RB per antenna
d. Orthogonally multiplexed from different antennas within a cell and from different cells
e. Avoid REs used for cell-specific RSs, control channels, and Rel-10 UE-specific RSs to ensure backward compatibility The CSI-RS configuration is UE-specific. Thus, CSI-RSs are present only in some specific subframes based on a given duty cycle and subframe offset, which are provided through radio resource control (RRC) signaling.

For rate matching for PDSCH transmissions of a Release-10 LTE, a UE assumes that the PDSCH data is only mapped to surrounding REs while for Release 9 and 10, the PDSCH transmissions are punctured with the CSI-RS transmission.

Since the CDM approach is used in CSI-RS transmissions, as shown in FIG. 3, the channel estimation performance may be improved under a cooperative MIMO system. Further, a muting method can be applied to avoid collisions with CSI-RS transmissions from other cells, thus providing better inter-cell interference coordination.

New Carrier Types

New carrier types (NCTs) have been introduced for carrier aggregation to provide for better spectral efficiency, improved support for heterogeneous network (HetNet) using low-power remote radio heads (RRHs), and energy efficiency. For example, in an unsynchronized NCT, the remote radio head (RRH) may be deployed in a dense area to enhance the capacity of the cell, as well as at the cell edge to improve cell edge performance. Further, small cells may be deployed over macro cells by using low-powered RRHs, resulting in a heterogeneous network scenario, as shown by FIG. 4.

Figure 4:
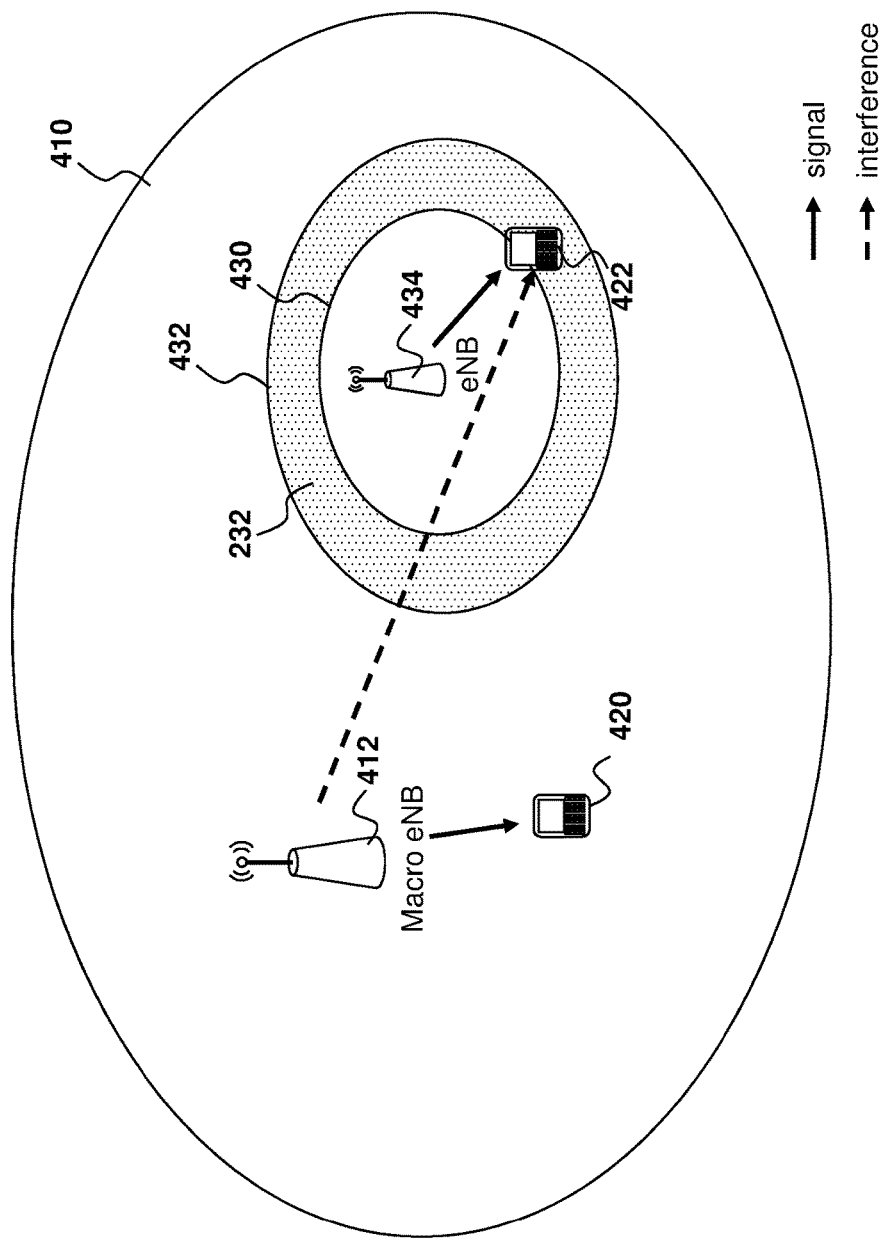
FIG. 4 is block diagram showing an example heterogeneous network.

In particular, in FIG. 4 a macro cell 410 includes a macro eNB 412 which transmits UEs 420 and 422 within the cell.

A small cell 430 is introduced within macro cell 410 in order to provide for better cell edge performance or to enhance performance in dense areas. The cell 430 may be a pico cell with a range expansion area as shown by reference numeral 432. A pico eNB 434 may thus provide service to a UE, for example UE 422, within the coverage area of the pico cell 430 or range expansion area 432.

In terms of a heterogeneous network environment, a shared cell ID scenario may be utilized, where legacy carriers on the macro cells overlap with additional carriers on pico cells and vice versa. In this case, the pico cell may benefit from a reduction in interference due to a minimization of mandatory transmissions. For example, the macro cell 410 may be configured as the primary cell and the pico cell 434 may be configured as the secondary cell. Dynamic interference coordination may be performed by dynamically controlling the resource allocation and transmission power. Further, the overhead may be reduced to the physical downlink control channel and CRS by having the UE 422 listen to the control channel of macro cell 412 in order to configure for pico cell 434. The new carrier thus has spectral efficiency enhancements.

While the above is described with regard to a pico cell within a macro cell, other options are available. These include relays, femto cells, among other low powered nodes.

In the above, the NCT systems may not require the following channels or signals:
   a. Physical broadcast channel (PBCH)/Release-8 system information block (SIB)/Paging
   b. Primary synchronization signal (PSS)/Secondary synchronization signal (SSS)
   c. Physical downlink control channel (PDCCH)/Physical hybrid ARQ indicator channel (PHICH)/physical control format indicator channel (PCFICH)
   d. Cell-specific reference signal (CRS)
   e. Rel-10 mobility is based on measurements in backwards compatible Component Carriers (CCs)

Thus, the overhead used with common reference signals may be unnecessary for the new carrier types. In particular, the overhead for common reference signals may be more than 10% of the total available resources. Further, the common reference signals design approach may be conservative under a heterogeneous network scenario since a UE moving at 500 km per hour would pass through a small cell very quickly, for example. Thus, the conservative design for CRS may be unnecessary under a new carrier type and may limit the NCT system spectral efficiency. Further, the NCT designs may be applicable to both non-stand-alone carriers for carrier aggregation enhancements, for example in Release 11 LTE. However, this is not limiting and NCT may be extended to stand-alone cases or cases that do not require backward compatibility with Release 8, 9, 10 or 11 of the LTE standards.

In accordance with the present disclosure, a reference signal design is provided that allows for flexibility and scalability to achieve better spectral efficiency depending on the characteristics of the cell sites. The reference signal mapping may be either fixed or flexible and various signaling may be utilized to indicate to a UE to use the different reference signal mappings. A reference signal pattern is determined by a network element and used for providing reference signals to the user equipment. As used herein, the term "density" is used to indicate the type of reference signal pattern chosen, and a lower density pattern has less reference signals than a higher density pattern.

Thus, in accordance with one embodiment of the present disclosure, reference signal overheads are reduced while improving spectral system efficiency. In other words, the density of RSs for channel status reports, channel estimation, and time and frequency synchronization can be configured by depending on wireless channel characteristics in a given deployment scenario. In one embodiment, a density-reduced RS may be applied in pico cells or indoor environments due to the lower dispersive propagation channel and/or to users moving at lower speeds. For example, in a heterogeneous network system, the pico cell uses a density reduced RS while the macro cell uses an existing RS with normal density. However, this is not limiting and other deployment scenarios are possible.

The density reducing RS may be provided for either the non-stand-alone NCT for Release 11 LTE-Advanced or may be provided for a stand-alone NCT.

Fixed Reference Signal Mapping

In one embodiment of the present disclosure, a fixed reference signal mapping embodiment is provided. In accordance with the embodiment, channel characteristics are utilized to determine a reference signal mapping. For example, wireless channels of pico-cells or indoor environments are less dispersive than those of open or urban areas, and the cell type may be used as an indicator to use a certain reference signal mapping. Urban areas served by macro-cells are more dispersive and corresponding channel coherent time is shorter in a macro-cell than in these pico or indoor environments. Therefore, the density of reference signals for such less dispersive wireless channels may be different than for cell sites having a longer delay spread, while enhancing the system spectral efficiency due to the reduction of overheads. For example, for an RS design, criteria can either use a cell-specific RS design or a CDM design and can be adapted for a macro-cell scenario.

On the other hand, in heterogeneous network scenarios, the RS mappings are sub-sampled from that of the macro-cell scenarios depending on the wireless channel characteristics. In this case, sub-sampling ratios may be signaled using system information at the initial connection of the UE. RSs may be transmitted on specific subframes. In this case, the transmission period, such as the RSPeriodValue, may be signaled with higher layer signaling.

Figure 5:
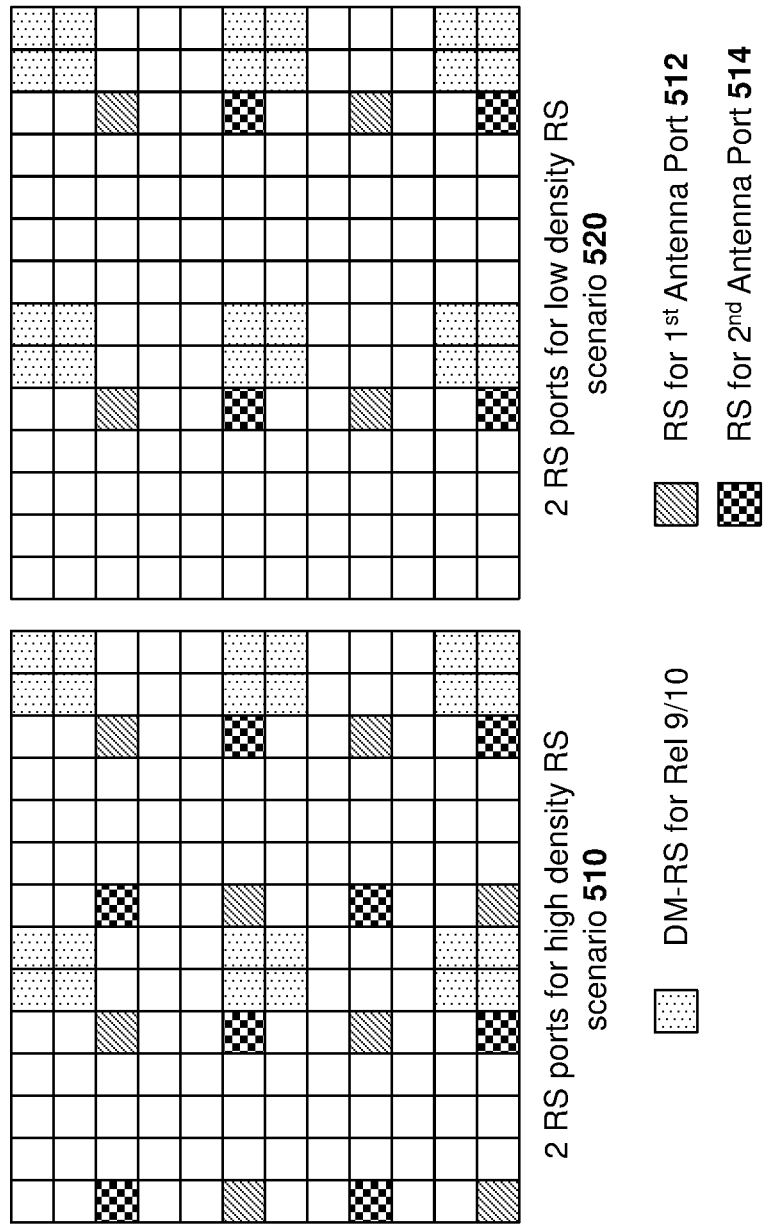
FIG. 5 is block diagram showing one example of RS mapping for a high and low density scenario utilizing a fixed mapping method.

The above may be illustrated utilizing an example and reference is now made to FIG. 5. The example of FIG. 5 shows a "high density" RS scenario 510 and a "low density" RS scenario 520. However, the present disclosure is not meant to be limited to only having two density scenarios and a plurality of density scenarios may be provided in some cases.

Further, the embodiment of FIG. 5 shows a puncturing of one half of the reference signals. However, the use of one half of the signals is meant as an example only and in other cases more than half of the signals may be punctured and in other cases less than half of the signals may be punctured.

Referring to FIG. 5, a high density scenario 510 provides for the reference signals, for example in a macro cell. In the example of FIG. 5, the proposed RS mapping with two antenna ports is considered without collision with DM-RSs of Release 9 or 10 LTE. In a high density scenario 510, for example, the number of RSs is the same as that of Release 8 for a high-density scenario. In particular, RSs for a first antenna port are identified, for example, with reference numeral 512 and RSs for a second antenna port are identified with reference numeral 514.

In a low density scenario 520, the number of reference signals is half of that for high density scenario 510 and, in this case, the first and third pilot symbol locations are punctured. The example of FIG. 5 is however only illustrative and in other cases the second and fourth pilot symbols may be punctured, the first and second pilot symbols may be punctured, the third and fourth pilot symbols may be punctured, among other combinations.

From FIG. 5, to enhance the channel estimation quality, RSs in the previous subframe, which is placed on the fifth symbol in the second slot, may be used with a corresponding increase in the computational complexity and memory requirements.

In another alternative, if the density-reduced RS is used on a carrier with PDCCH, the RS of the $5^{th}$ OFDM symbol of each slot may be eliminated. The RS of the first OFDM symbol of each slot may be kept to make sure the UE has RSs for PDCCH demodulation.

Figure 6:
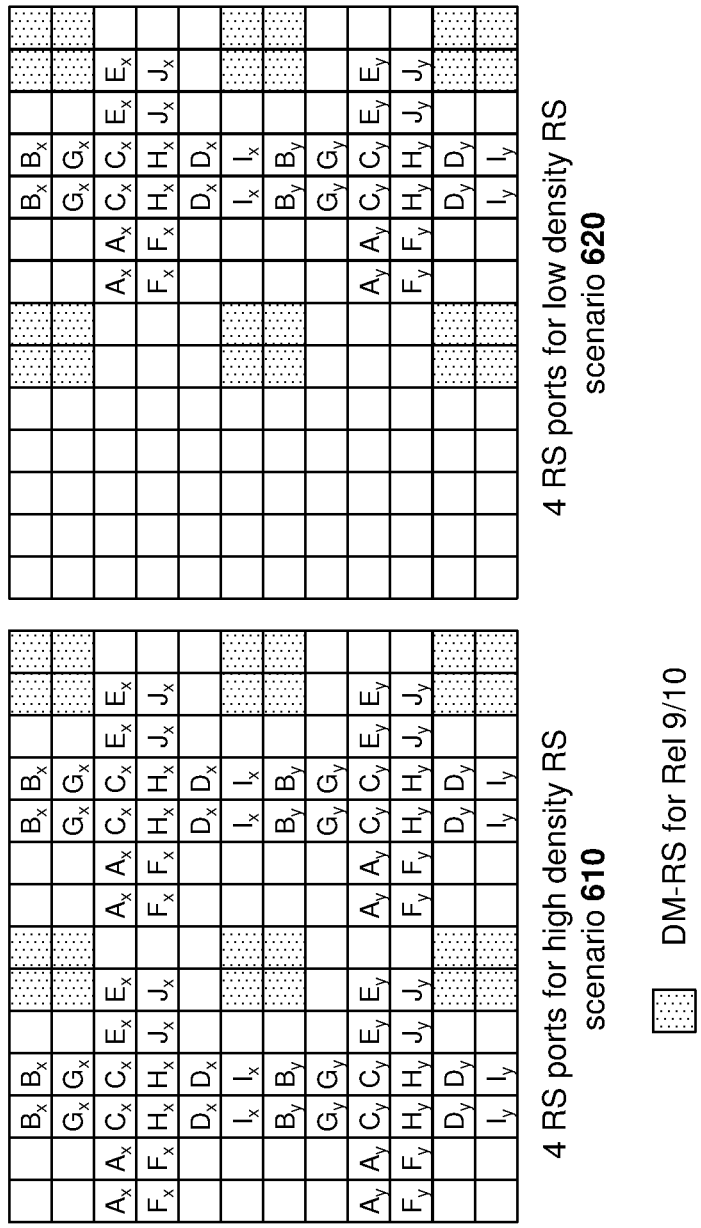
FIG. 6 is block diagram showing one example of RS mapping based on CDM for a high and low density scenario utilizing a fixed mapping method.

Referring to FIG. 6, the figure shows a second example of RS mapping based on code-division multiplexing. In particular, FIG. 6 shows an example of RS mapping with four antenna ports based on CSI-RS patterns, which uses CDM approach rather than staggered CRS, to make more efficient RS design and interface coordination of the multiple cooperative transmission scheme, such as CoMP and HetNet scenarios.

As shown in FIG. 6, a high density scenario 610 may be used, for example, for a macro cell, whereas a low density scenario 620 may be used, for example, for a pico cell. In the embodiment of FIG. 6, the signal "Ax" represents the cell index "A" and the antenna port "x", where "x" is used for antenna port 0 and 1 and "y" is used for antenna port 2 and 3.

FIG. 6 shows half of the reference signals removed in the low density scenario, freeing up space for other purposes.

Further, as shown in the scenario 620, the RSs don't exist in the first slot of the subframe. In this case, the RSs in the previous subframe may optionally be used to improve accuracy of channel estimates.

The puncturing scheme shown in scenario 620 is however only an example. Other puncturing schemes from the high density scenario 610 may also be applied.

While the timing division sub-sampling is considered in the examples of FIGS. 5 and 6, the sub-sampling in the frequency domain is also one embodiment of the present disclosure. The aforementioned embodiments may, in addition, be applied to RS mappings for unsynchronized NCT scenarios in some cases.

Flexible Reference Signal Mapping

A flexible RS mapping scenario may be used depending on the wireless channel characteristics and cell site deployment scenarios. Unlike the fixed reference signal mapping as described above, which is sub-sampled from a high-density reference signal scenarios for a low-density one, the present embodiment has mapping patterns for low-density scenarios which are independent from those of the high-density scenarios.

In other words, the locations of RSs for low-density scenarios are different from those of high-density scenarios. The mapping method may, in some embodiments, be signaled with system information at an initial stage. Alternatively, RSs may be transmitted on specific subframes. In this case, the transmission period, such as the RSPeriodValue, may be signaled by higher layer signaling such as the dedicated RRC signaling or the medium access control (MAC) control element.

Figure 7:
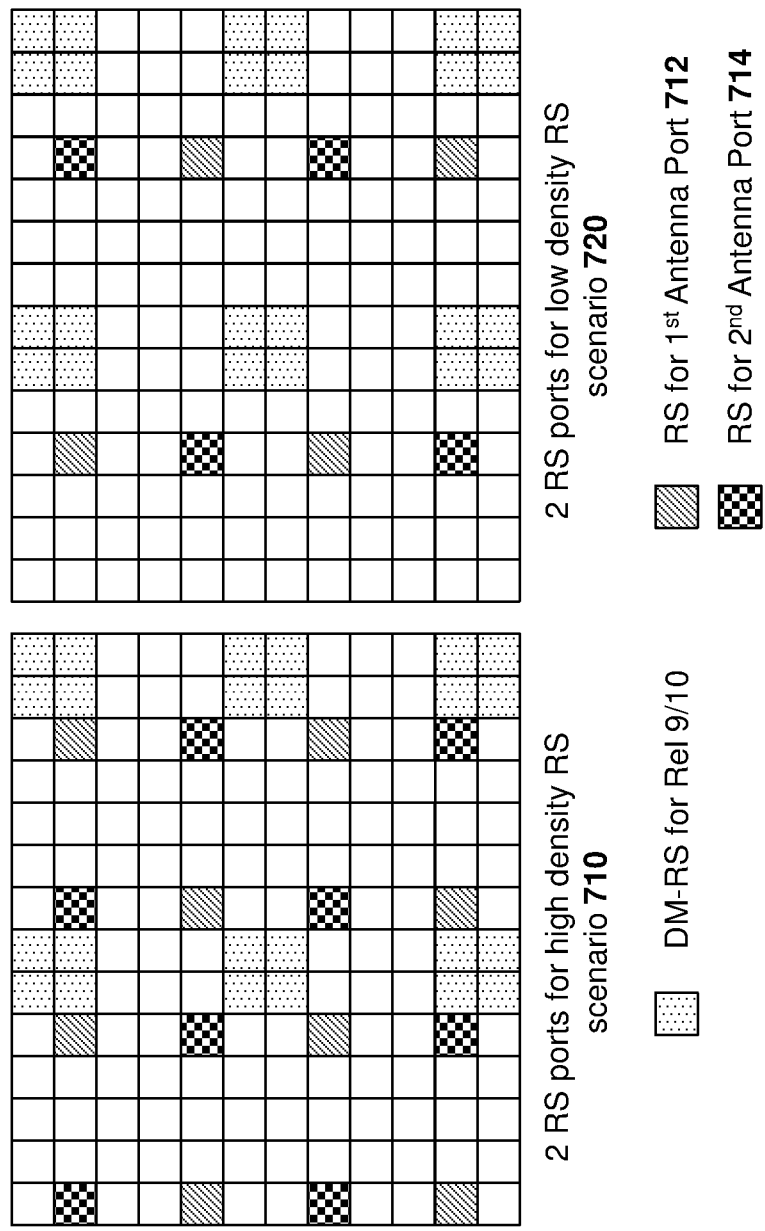
FIG. 7 is block diagram showing one example of RS mapping for a high and low density scenario utilizing a flexible mapping method.

Reference is now made to FIG. 7, which shows one example for flexible cell-specific RS mappings having two antenna ports for a low and a high density scenario. As with the fixed reference signal mapping scenario, the use of two densities is merely meant as an example and a plurality of densities could be utilized. Again, as used herein, a high density scenario merely indicates the use of more reference signals for channel estimations whereas a lower density signal has less reference signals. In the example of FIG. 7, the proposed RSs are mapped without collision with DM-RSs of Release 9 or 10 LTE.

Although the RS mapping of scenario 710 is similar to that of the embodiment 510 of FIG. 5, the mapping for the low density scenario 720 of FIG. 7 is different from that of embodiment 520 of FIG. 5 to allow for symmetry of RSs. The symmetry of the RSs and the uniform spacing between RSs may reduce the error in the assigned RBs. The mapping method and density may be configurable depending on the wireless channel statistics.

In the embodiment of FIG. 7, the RS for the first antenna port is shown with reference numeral 712, while the RS for the second antenna port is shown with reference numeral 714.

In one embodiment, to enhance the channel estimation quality, RSs in the previous subframe, which is placed on the $4^{th}$ symbol in the $2^{nd}$ slot, may be used).

In the case of flexible reference signal mapping, multiple different RS patterns may be pre-configured or pre-set to suit different scenarios. For example, one RS pattern may be designed for a macro cell scenario and one RS pattern may be designed for an indoor low mobility scenario. The different patterns may have different time domain periodicities and frequency-domain periodicities. The time domain offset and the frequency domain offset could also be different. Different patterns may have an index and the index may be signaled to UEs within the cell coverage through either broadcast signaling or dedicated signaling such as the RRC signaling or MAC Control Elements. The signaling may come from either the macro eNB or from a small cell such as a pico eNB.

When a UE enters a cell or starts to monitor the cell, the UE may obtain the RS pattern information for the cell and start the measurement procedures based on the obtained RS pattern information. When a handover occurs, the information about the RS pattern may be signaled in the handover command message, for example.

In one alternative, different patterns may be designed from a common RS pattern through a density reduction on the time domain or frequency domain. For example, low density pattern may be designed by periodically removing the RSs on the time domain or frequency domain from the high density RS pattern. If the high density pattern is transmitted every subframe, the low density pattern could be transmitted every other subframe, for example, or every $4^{th}$ subframe for example, but with the same pattern in each resource block.

In a further embodiment, the low density pattern could be designed completely differently and not derived from a common set. In this case, the pattern may be optimized for different densities and/or scenarios. Extra signaling or standardizations may be required to allow the UE to correctly interpret the RS pattern.

Figure 8:
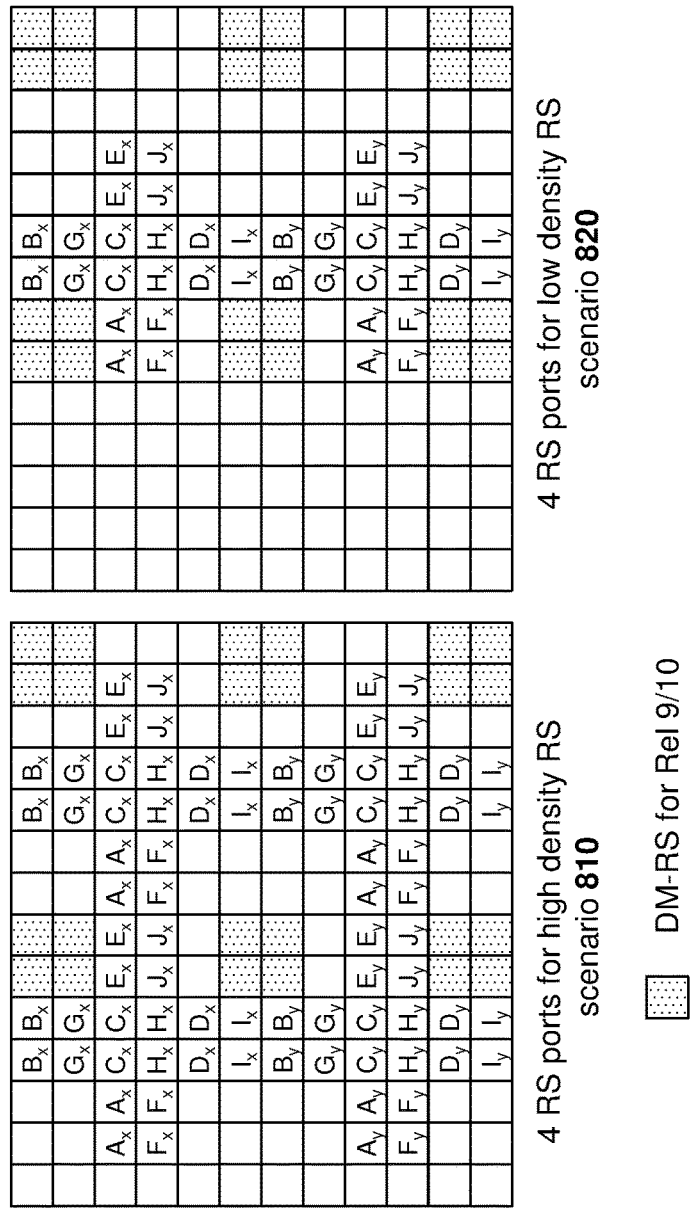
FIG. 8 is block diagram showing one example of RS mapping based on CDM for a high and low density scenario utilizing a flexible mapping method.

Reference is now made to FIG. 8, which shows a CDM based example. As in the example of FIG. 6, the example of FIG. 8 shows RS mapping with four antenna ports based on CSI-RS mappings, which use a CDM approach rather than staggering CRS. In order to make a more efficient RS design and interference coordination of the multiple cooperative transmission scheme, such as a CoMP and HetNet scenario, FIG. 8 shows a high and a low density scenario 810 and 820 respectively.

High density scenario 810 of FIG. 8 is similar to that of the high density scenario 610 of FIG. 6.

A low density scenario 820 however reduces the RS density by 50%. This ratio however may be configurable and 50% is merely meant as an example.

Comparing the embodiments of FIG. 6 and FIG. 8, and in particular scenarios 620 and 820, the location of reference signals is different. In one embodiment the different locations may be made to avoid locations from high density mappings. Further, reference signals may be moved towards the middle of the slot to improve the channel estimation.

In one embodiment, the RSs in a previous subframe may be used to improve the accuracy of channel estimates. In alternative embodiments, to provide better resolution of RS mappings, a five cell index (A-E) may be repeated instead of using a ten cell index (A-J).

Similar to the fixed reference signal mapping of FIGS. 5 and 6, sub-sampling in the frequency domain may also be provided. The above may also be applied to RS mappings for unsynchronized NCT scenarios.

Signaling

The RS configuration may be signaled to a UE depending on the scenario. In a density reduced RS scenario for a stand-alone carrier, the RS configuration may need to be conveyed to the UE immediately upon power up of the UE. The UE may need to know the RS configuration at the initial synchronization in order for the UE to decode the physical broadcast channel and other channels. In this case, the RS configuration may be embedded within the PSS/SSS. To achieve this, the RS configuration can be associated with the physical cell identity (PCI) which is carried on the PSS/SSS.

For example, in one embodiment, a separate PCI space may be provided for macro cells and for small cells such as pico cells. In this case, if a macro cell is identified, then the UE may assume a high density scenario whereas, if a small cell is identified, the UE may assume a low density scenario. Thus, when the UE obtains a PCI from the PSS/SSS it may know whether it is attaching to a macro cell or small cell and assume the RS of either a high density for the macro cell and the RS of a reduced density for a small cell.

The distinction between macro cell and small/pico cell is however not meant to be limiting and in other cases an indicator could be provided to the UE to indicate the type of density that the cell utilizes. In this case, some macro cells may be able to use low density scenarios whereas some pico cells may be able to use high density scenarios, as one example.

If the density reduced RS is applied to a non-stand-alone carrier such as a non-stand-alone secondary cell, then the RS configuration may be delivered to the UE through the primary cell RRC signaling, since the UE will have access to the stand-alone primary cell first.

Reference is now made to Table 1 below.

TABLE 1

CDM-RS-Config information element

```
-- ASN1START
CDM-RS-Config-r12 ::=    SEQUENCE {
        CDM-RS-r12          CHOICE {
            release                 NULL,
            setup                   SEQUENCE {
                antennaPortsCount-r12     ENUMERATED {an1, an2, an4, an8},
                resourceConfig-r12        INTEGER (0..31),
                subframeConfig-r12        INTEGER (0..154),
                p-C-r12                   INTEGER (-8..15)
                RSMappingRule             BOOLEAN            % Flexible or Fixed
                RSCellInfo                INTEGER (0..2)     % high, medium, low
                RSValuePeriod             INTEGER (0..9)     % Optional
                DensityRatio              INTEGER (0..1)     % ratio for RSCellInfo
            }
        }
                                                OPTIONAL,          -- Need O
        zeroTxPowerCDM-RS-r12       CHOICE {
            release                 NULL,
            setup                   SEQUENCE {
                zeroTxPowerResourceConfigList-r12    BIT STRING (SIZE (16)),
                zeroTxPowerSubframeConfig-r12        INTEGER (0..154)
            }
        }                                       OPTIONAL           -- Need ON
}
-- ASN1STOP
```

As seen above, the CDM-RS-Config information element may have various values provided including an RSMappingRule, which indicates whether the RS mapping is flexible or fixed. RSCellInfo may provide an integer from 0 to 2 to indicate a high, medium or low density for the RS mapping. However, the use of three values is not limiting and in other scenarios more or less densities may be utilized.

The RSPeriodValue provides for time domain puncturing for one resource. For example, a value of 0 may indicate every subframe whereas a value of 1 may indicate every other subframe and a value of 2 may indicate every fourth subframe. However, the above are merely meant as examples and the RSPeriodValue could indicate various levels of time domain puncturing.

A DensityRatio may optionally be included in the information element which may indicate the RS cell info. There may be two high density scenarios with different density ratios with different ratio patterns in the example of Table 1 above.

Figure 9:
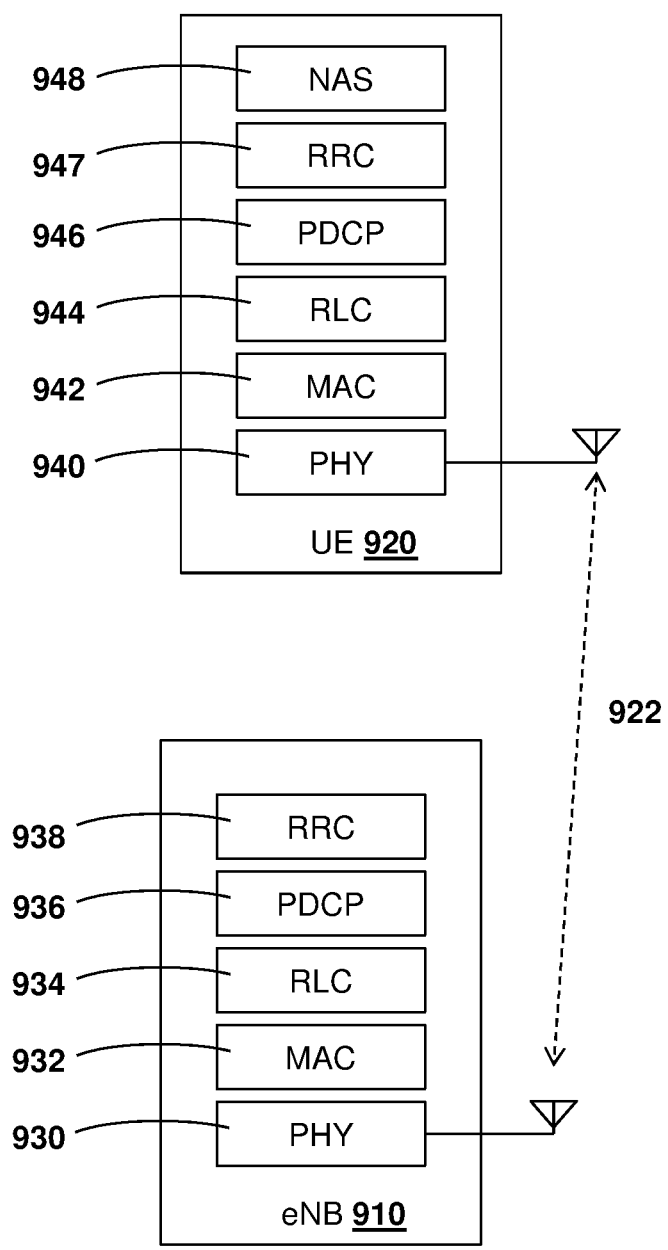
FIG. 9 is a schematic diagram showing an example protocol stack in a wireless communication system.

The signaling of the RS mapping is typically done between the same protocol layer between the network element and the UE. Reference is now made to FIG. 9, which shows a simplified architecture for communication between various elements in a system for the control plane. A similar protocol stack exists for the user plane. In particular, a network element such as eNB 910 provides cell coverage to a first area and may serve a UE 920, which communicates with eNB 910 through wireless communication link 922.

As shown in the example of FIG. 9, each element includes a protocol stack for the communications with other elements. In the case of eNB 910, the eNB includes a physical layer 930, a medium access control (MAC) layer 932, a radio link control (RLC) layer 934, a packet data convergence protocol (PDCP) layer 936 and a radio resource control (RRC) layer 938.

In the case of UE 920, the UE includes a physical layer 940, a MAC layer 942, an RLC layer 944, a PDCP layer 946, an RRC layer 947 and a non-access stratum (NAS) layer 948.

Communications between the entities, such as between eNB 910 and UE 920, generally occur within the same protocol layer between the two entities. Thus, for example, communications from the RRC layer at eNB 910 travels through the PDCP layer, RLC layer, MAC layer and physical layer and get sent over the physical layer to UE 920. When received at UE 920, the communications travel through the physical layer, MAC layer, RLC layer, PDCP layer to the RRC level of UE 920. Such communications are generally done utilizing a communications sub-system and a processor, as described in more detail below.

Figure 10:
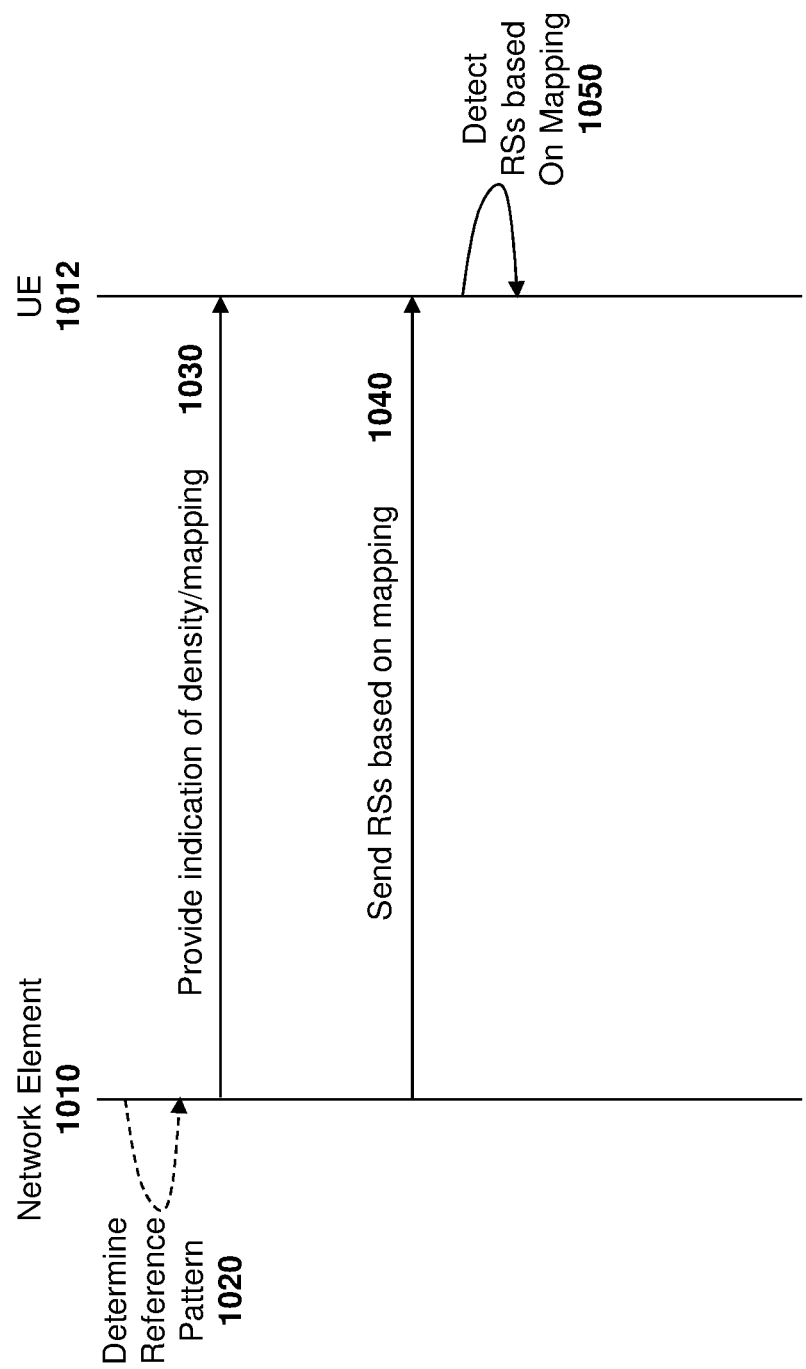
FIG. 10 is a signaling diagram showing the sending of RSs between a network element and UE.

Based on the above, reference is now made to FIG. 10, which shows a signaling diagram between a network element 1010 and a UE 1012. Network element 1010 may be any network element and can include a macro or pico eNB, for example.

As seen by arrow 1020, the network element determines a density level. The density level may be determined by default, for example in the case of a macro cell automatically being a high density cell and a pico cell automatically being a low density cell. In other cases the density level may be determined based on a policy, for example, by a network administrator such as a carrier. Other examples are possible.

The network element 1010 provides an indication of the density and/or RS mapping to UE 1012 explicitly or implicitly, as shown by arrow 1030. The indication of arrow 1030 may be an explicit signaling of the RS mapping, for example through a broadcast channel or higher layer signaling. The indication may also be implicit, for example signaling the network type in the case where a macro cell automatically uses the high density mapping. Such an implicit indication may include the use of the PCI with the PSS/SSS, as described above, for example.

The UE 1012 receives and stores the indication and at a future point receives RSs that utilize the density mapping, as shown by arrow 1040. The UE then detects the RSs based on the density mapping stored, as shown by arrow 1050.

The above may be implemented by any network element. A simplified network element is shown with regard to FIG. 11.

Figure 11:
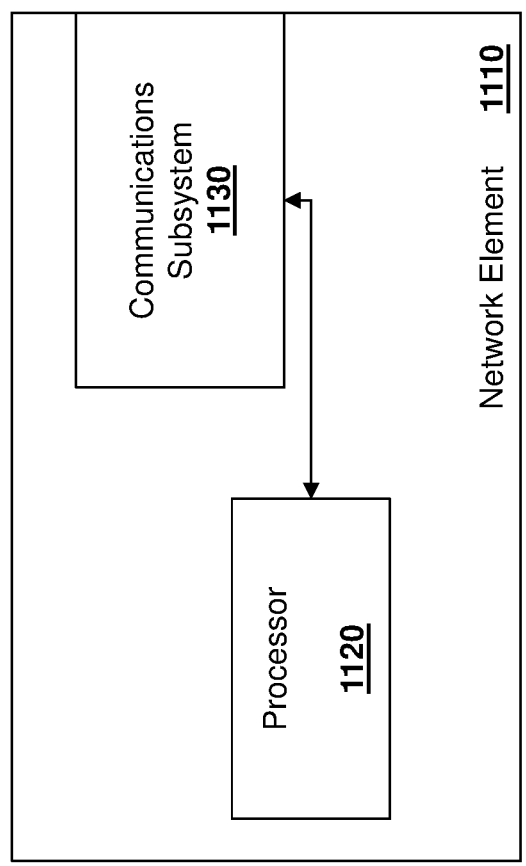
FIG. 11 is a block diagram showing a simplified example network element.

In FIG. 11, network element 1110 includes a processor 1120 and a communications subsystem 1130, where the processor 1120 and communications subsystem 1130 cooperate to perform the methods described above.

Further, the above may be implemented by any UE. One exemplary device is described below with regard to FIG. 12.

UE 1200 is typically a two-way wireless communication device having voice and data communication capabilities. UE 1100 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1200 is enabled for two-way communication, it may incorporate a communication subsystem 1211, including both a receiver 1212 and a transmitter 1214, as well as associated components such as one or more antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate. The radio frequency front end of communication subsystem 1211 can be any of the embodiments described above.

Network access requirements will also vary depending upon the type of network 1219. In some networks network access is associated with a subscriber or user of UE 1200. A UE may require a removable user identity module (RUIM) or a subscriber identity module (SIM) card in order to operate on a network. The SIM/RUIM interface 1244 is normally similar to a card-slot into which a SIM/RUIM card can be inserted and ejected. The SIM/RUIM card can have memory and hold many key configurations 1251, and other information 1253 such as identification, and subscriber related information.

Figure 12:
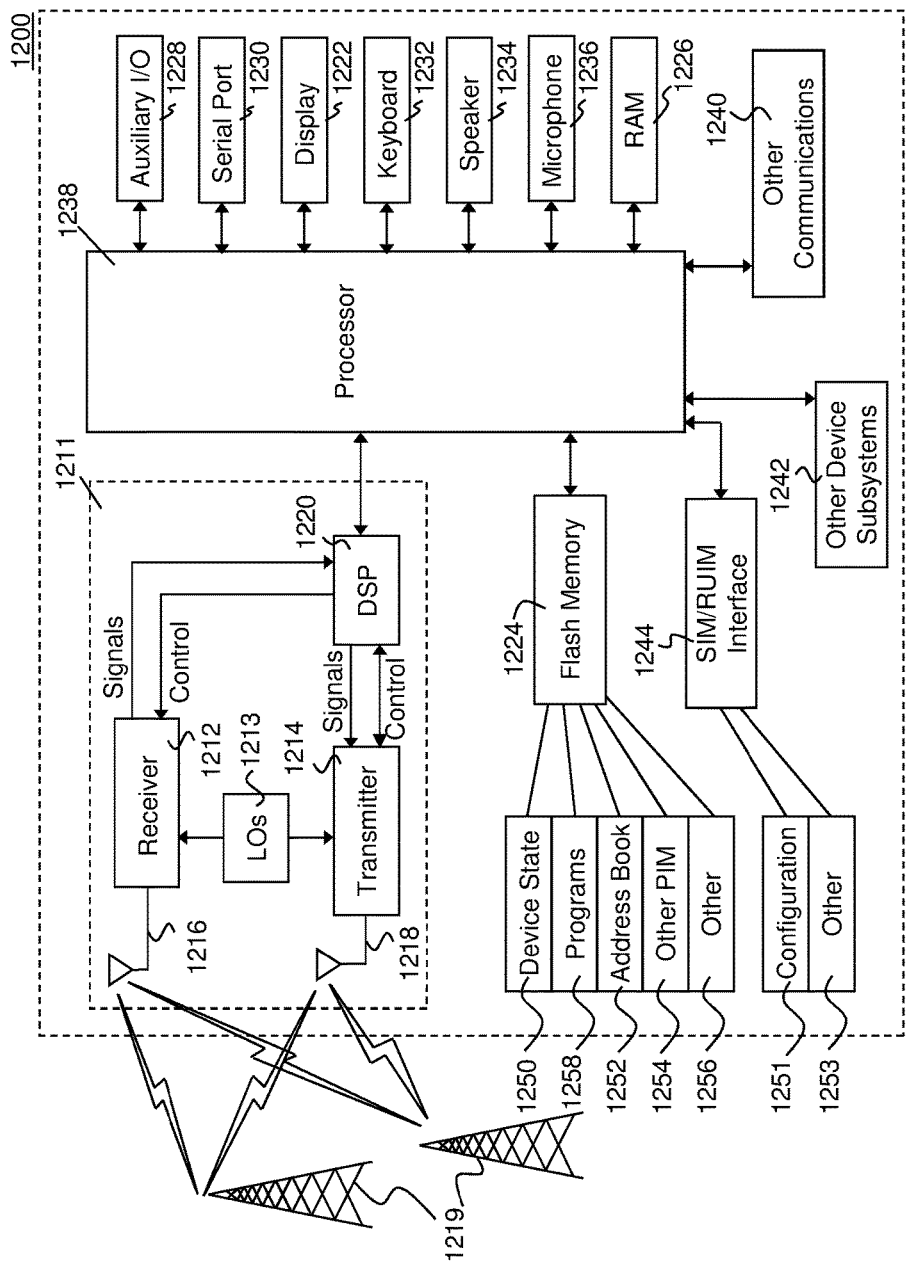
FIG. 12 is a block diagram of an example user equipment.

When required network registration or activation procedures have been completed, UE 1200 may send and receive communication signals over the network 1219. As illustrated in FIG. 12, network 1219 can consist of multiple base stations communicating with the UE.

Signals received by antenna 1216 through communication network 1219 are input to receiver 1212, which may perform such common receiver functions as signal amplification, frequency down conversion, filtering, channel selection and the like. A/D conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

UE 1200 generally includes a processor 1238 which controls the overall operation of the device. Communication functions, including data and voice communications, are performed through communication subsystem 1211. Processor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem and any other device subsystems generally designated as 1242. Serial port 1230 could include a USB port or other port known to those in the art.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the processor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Processor 1238, in addition to its operating system functions, may enable execution of software applications on the UE. A predetermined set of applications that control basic operations, including at least data and voice communication applications for example, will normally be installed on UE 1200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1219. Further applications may also be loaded onto the UE 1200 through the network 1219, an auxiliary I/O subsystem 1228, serial port 1230, short-range communications subsystem 1240 or any other suitable subsystem 1242, and installed by a user in the RAM 1226 or a non-volatile store (not shown) for execution by the processor 1238. Such flexibility in application installation increases the functionality of the device and may provide enhanced on-device functions, communication-related functions, or both. For example, secure communication applications may enable electronic commerce functions and other such financial transactions to be performed using the UE 1200.

In a data communication mode, a received signal such as a text message or web page download will be processed by the communication subsystem 1211 and input to the processor 1238, which may further process the received signal for output to the display 1222, or alternatively to an auxiliary I/O device 1228.

A user of UE 1200 may also compose data items such as email messages for example, using the keyboard 1232, which may be a complete alphanumeric keyboard or telephone-type keypad, among others, in conjunction with the display 1222 and possibly an auxiliary I/O device 1228. Such composed items may then be transmitted over a communication network through the communication subsystem 1211.

For voice communications, overall operation of UE 1200 is similar, except that received signals would typically be output to a speaker 1234 and signals for transmission would be generated by a microphone 1236. Alternative voice or audio I/O subsystems, such as a voice message recording subsystem, may also be implemented on UE 1200. Although voice or audio signal output is generally accomplished primarily through the speaker 1234, display 1222 may also be used to provide an indication of the identity of a calling party, the duration of a voice call, or other voice call related information for example.

Serial port 1230 in FIG. 12 would normally be implemented in a personal digital assistant (PDA)-type UE for which synchronization with a user's desktop computer (not shown) may be desirable, but is an optional device component. Such a port 1230 would enable a user to set preferences through an external device or software application and would extend the capabilities of UE 1200 by providing for information or software downloads to UE 1200 other than through a wireless communication network. The alternate download path may for example be used to load an encryption key onto the device through a direct and thus reliable and trusted connection to thereby enable secure device communication. As will be appreciated by those skilled in the art, serial port 1230 can further be used to connect the UE to a computer to act as a modem or to a power source for charging.

Other communications subsystems 1240, such as a short-range communications subsystem, is a further optional component which may provide for communication between UE 1200 and different systems or devices, which need not necessarily be similar devices. For example, the subsystem 1240 may include an infrared device and associated circuits and components or a Bluetooth™ communication module to provide for communication with similarly enabled systems and devices. Subsystem 1240 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for receiving reference signals at a user equipment from a network element, the method comprising:
   determining, based on signaling by the network element, a reference signal mapping at the user equipment, wherein the signaling indicates a density for the reference signal mapping, the density being one of a high density and a low density, and wherein the low density indicates fewer reference signals than the high density; and
   detecting the reference signals at the user equipment using the reference signal mapping;

and
wherein the low density mapping is a first set of reference signals and the high density mapping is a second set of reference signals; and
wherein the first set of reference signals is not a subset of the second set of reference signals.

2. The method of claim 1, wherein the signaling utilizes an information element.

3. The method of claim 2, wherein the information element is a Code Division Multiplexing Reference Signal Configuration information element.

4. The method of claim 1 wherein the signaling provides for a mapping rule to indicate whether the reference signal mapping is fixed or flexible.

5. The method of claim 1, wherein the signaling provides for a value mapped to the reference signal pattern.

6. The method of claim 1, wherein the reference signal mapping is received over broadcast signaling.

7. The method of claim 1, wherein the signaling includes a type of the network element.

8. The method of claim 7, wherein a lower density reference signal mapping is used for at least one of a small cell; a lower delay spread cell; and a longer coherence time of channels cell.

9. The method of claim 8, wherein the small cell is a pico cell in a heterogeneous network.

10. The method of claim 1, wherein the reference signal mapping differs between subframes.

11. The method of claim 1, wherein the detecting uses reference signals from a previous subframe in addition to reference signals from a present subframe.

12. The method of claim 1, wherein the mapping is based on a common reference signal mapping.

13. The method of claim 1, wherein the mapping is based on a code division multiplexing mapping.

14. A user equipment for receiving reference signals from a network element, the user equipment comprising:
a processor, and
memory connected to the processor;
wherein the processor connected to the memory is configured to:
determine, based on signaling by the network element, a reference signal mapping at the user equipment, wherein the signaling indicates a density for the reference signal mapping, the density being one of a high density and a low density, and wherein the low density indicates fewer reference signals than the high density; and
detect the reference signals at the user equipment using the reference signal mapping;
and
wherein the low density mapping is a first set of reference signals and the high density mapping is a second set of reference signals; and
wherein the first set of reference signals is not a subset of the second set of reference signals.

15. The user equipment of claim 14, wherein the signaling utilizes an information element.

16. The user equipment of claim 15, wherein the information element is a Code Division Multiplexing Reference Signal Configuration information element.

17. The user equipment of claim 14, wherein the signaling provides for a mapping rule to indicate whether the reference signal mapping is fixed or flexible.

18. The user equipment of claim 14, wherein the signaling provides for a value mapped to the reference signal pattern.

19. The user equipment of claim 14, wherein the reference signal mapping is received over broadcast signaling.

20. The user equipment of claim 14, wherein the signaling includes a type of the network element.

21. The user equipment of claim 20, wherein a lower density reference signal mapping is used for at least one of a small cell; a lower delay spread cell; and a longer coherence time of channels cell.

22. The user equipment of claim 21, wherein the small cell is a pico cell in a heterogeneous network.

23. The user equipment of claim 14, wherein the reference signal mapping differs between subframes.

24. The user equipment of claim 14, wherein processor is configured to detect by using reference signals from a previous subframe in addition to reference signals from a present subframe.

* * * * *